United States Patent
Bae et al.

(10) Patent No.: US 9,891,746 B2
(45) Date of Patent: Feb. 13, 2018

(54) DISPLAY APPARATUS CAPABLE OF IMAGE SCANNING AND DRIVING METHOD THEREOF

(71) Applicant: CRUCIALTEC CO., LTD., Gyeonggi-do (KR)

(72) Inventors: Byung Seong Bae, Gyeonggi-do (KR); Ho Sik Jeon, Chungcheongnam-do (KR); Woo Young Choi, Seoul (KR); Jong Uk Kim, Gyeonggi-do (KR); Jun Suk Lee, Gyeonggi-do (KR); So Hyun Jeong, Chungcheongnam-do (KR); Ju An Yoon, Chungcheongnam-do (KR); Sang A Oh, Seoul (KR)

(73) Assignee: CRUCIALTEC CO., LTD., Gyeonggi-do (KR)

( * ) Notice: Subject to any disclaimer, the term of this patent is extended or adjusted under 35 U.S.C. 154(b) by 142 days.

(21) Appl. No.: 14/938,267

(22) Filed: Nov. 11, 2015

(65) Prior Publication Data
US 2016/0132176 A1    May 12, 2016

(30) Foreign Application Priority Data

Nov. 12, 2014  (KR) .................. 10-2014-0156874
Dec. 26, 2014  (KR) .................. 10-2014-0190693

(51) Int. Cl.
| | |
|---|---|
| *G06F 3/045* | (2006.01) |
| *G06F 3/041* | (2006.01) |
| *G06F 3/044* | (2006.01) |
| *G06K 9/00* | (2006.01) |
| *G06F 3/042* | (2006.01) |

(52) U.S. Cl.
CPC ............ *G06F 3/0416* (2013.01); *G06F 3/044* (2013.01); *G06F 3/0412* (2013.01); *G06F 3/0421* (2013.01); *G06K 9/0002* (2013.01)

(58) Field of Classification Search
CPC ...... G06F 3/0412; G06F 3/042; G06F 3/0416; G06F 3/0421; G06F 3/044; G06K 9/0002
USPC ................................................. 345/174
See application file for complete search history.

(56) References Cited

U.S. PATENT DOCUMENTS

| | | | | |
|---|---|---|---|---|
| 2014/0139492 | A1* | 5/2014 | Liu .................. | G06F 3/0412 345/175 |
| 2015/0002414 | A1* | 1/2015 | Tan .................. | G06F 3/0412 345/173 |

* cited by examiner

*Primary Examiner* — Nicholas Lee
*Assistant Examiner* — Ngan T Pham Lu
(74) *Attorney, Agent, or Firm* — H.C. Park & Associates, PLC

(57) ABSTRACT

A display apparatus capable of image scanning and a driving method thereof are provided. A display apparatus capable of image scanning includes a plurality of contact sensors each of which includes an N-type transistor, a P-type transistor connected to a gate electrode of the N-type transistor, and a sensing capacitor, the plurality of contact sensors being arranged so as not to cover a unit color pixel area of a color filter layer; a first scan line to which a selective signal is periodically applied, the first scan line being connected to a source electrode of the N-type transistor; a second scan line to which a selective signal is applied followed by the first scan line, the second scan line being connected to the gate electrode and source electrode of the P-type transistor; and a readout line connected to the drain electrode of the N-type transistor.

16 Claims, 11 Drawing Sheets

[Fig. 1]
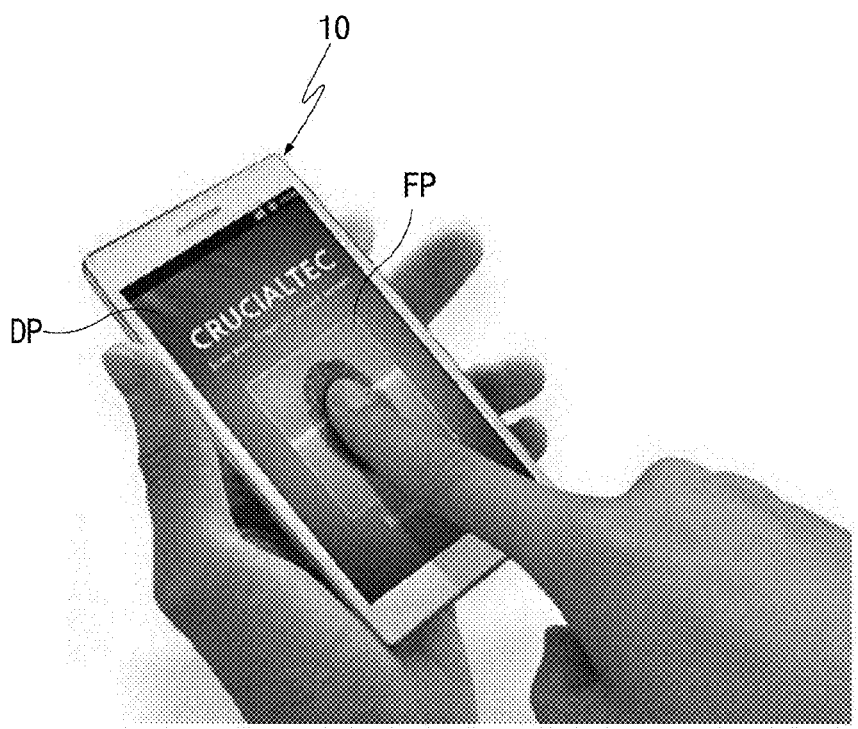

[Fig. 2a]
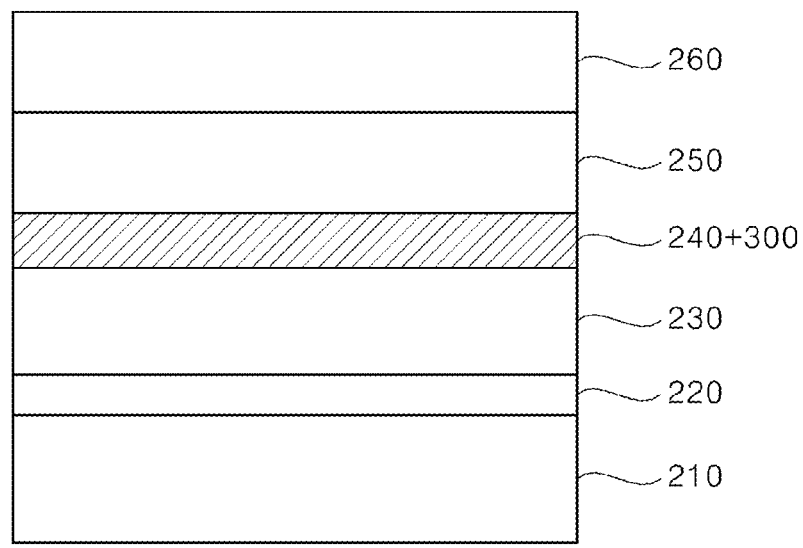
[Fig. 2b]
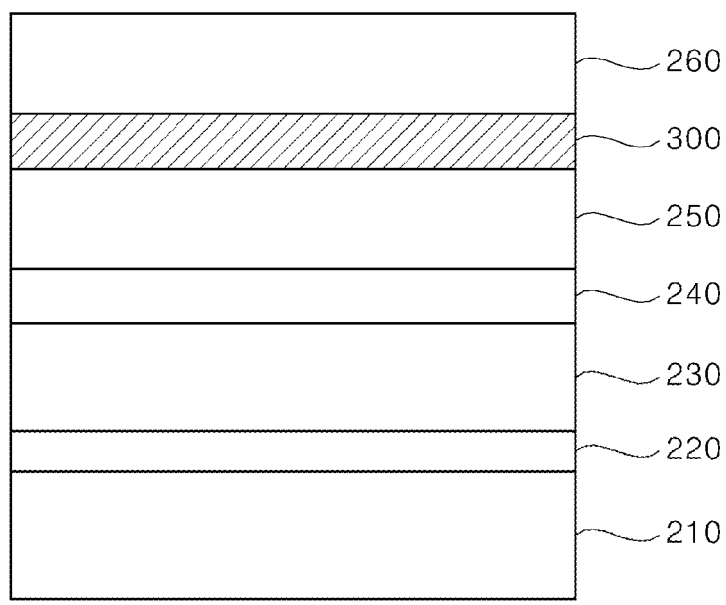

[Fig. 2c]
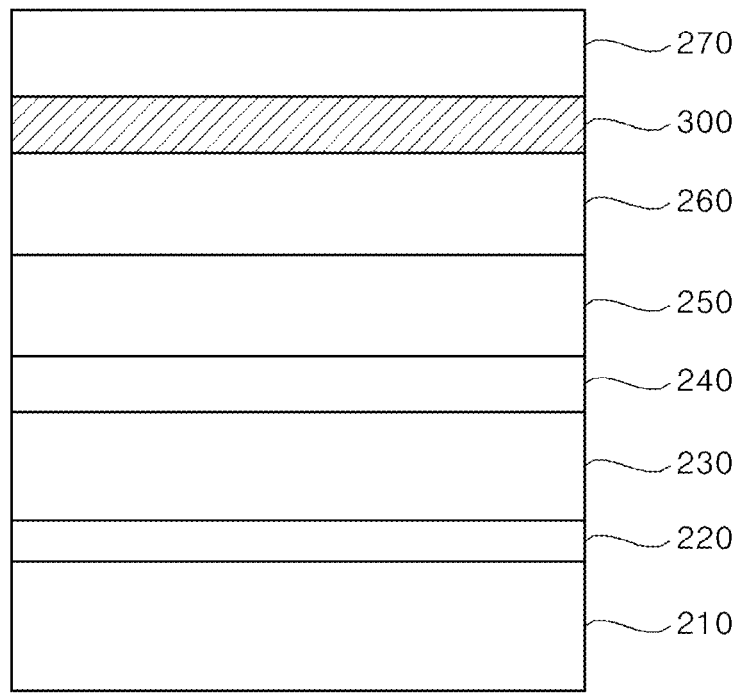
[Fig. 2d]
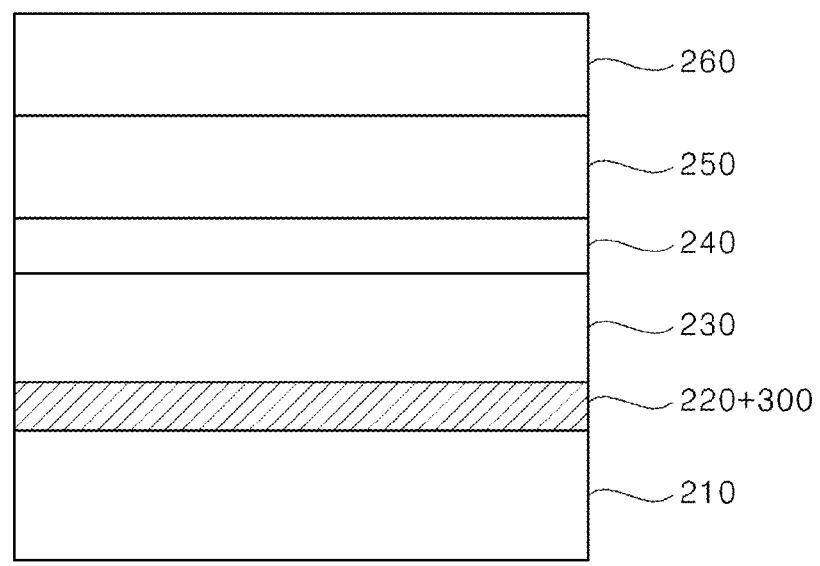

[Fig. 3]
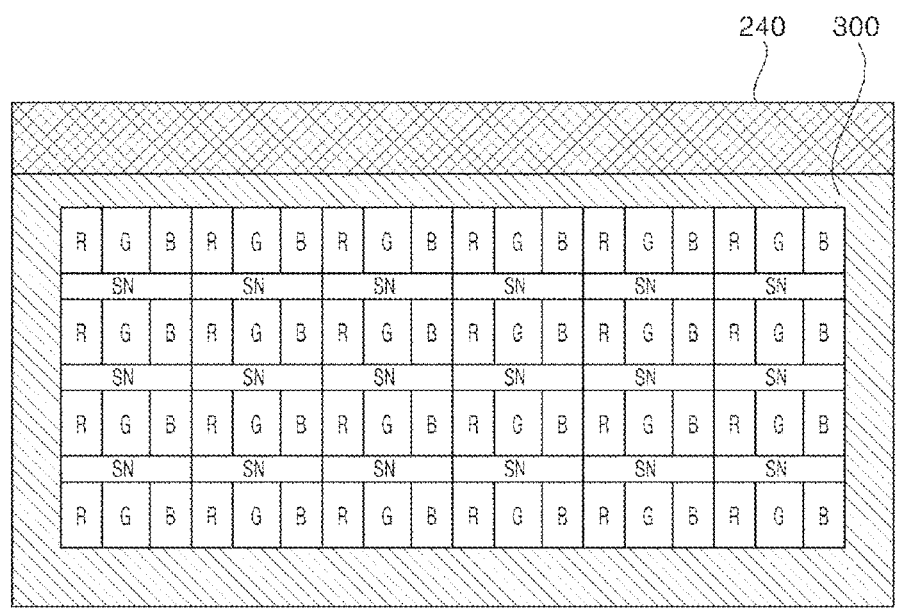

[Fig. 4]
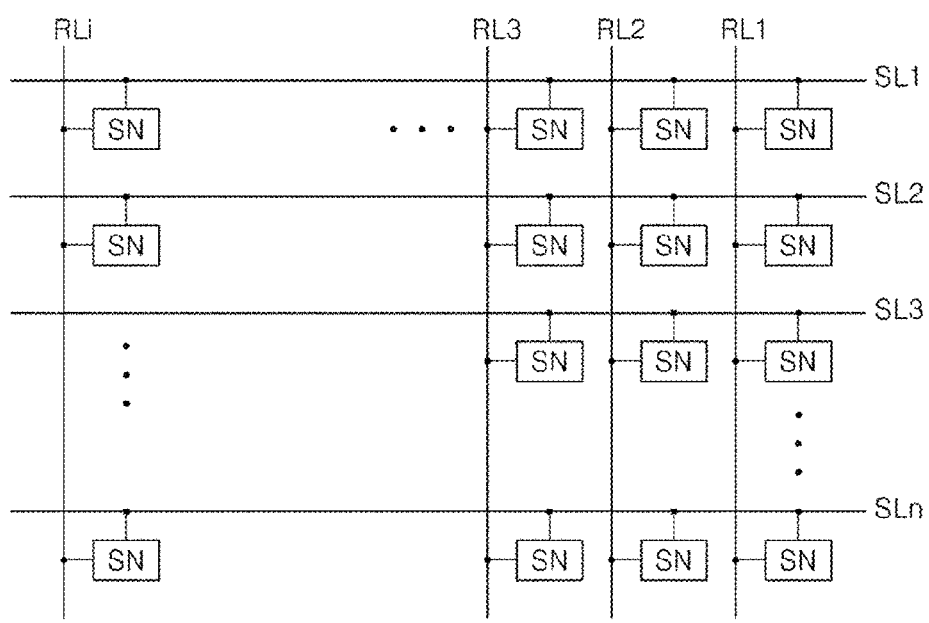

[Fig. 5]
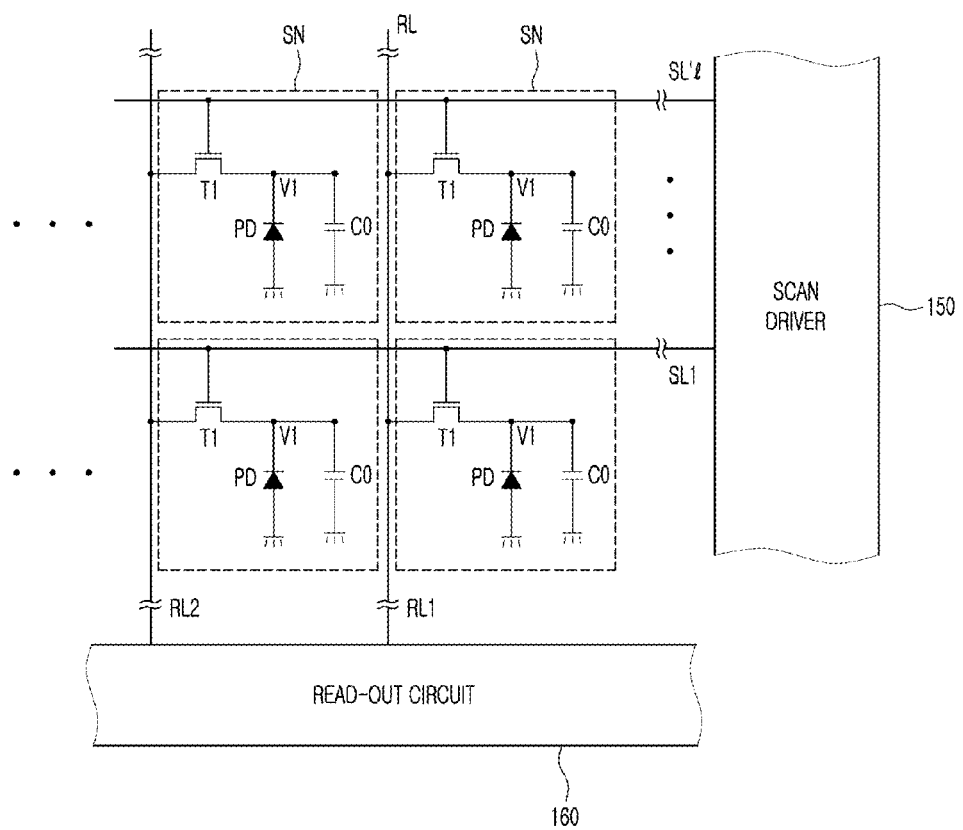

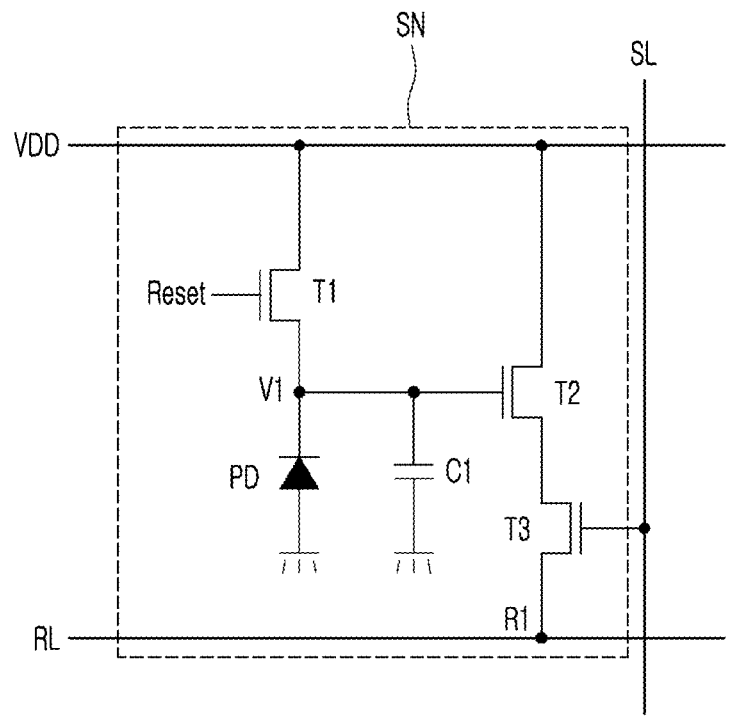
[Fig. 6]

[Fig. 7]
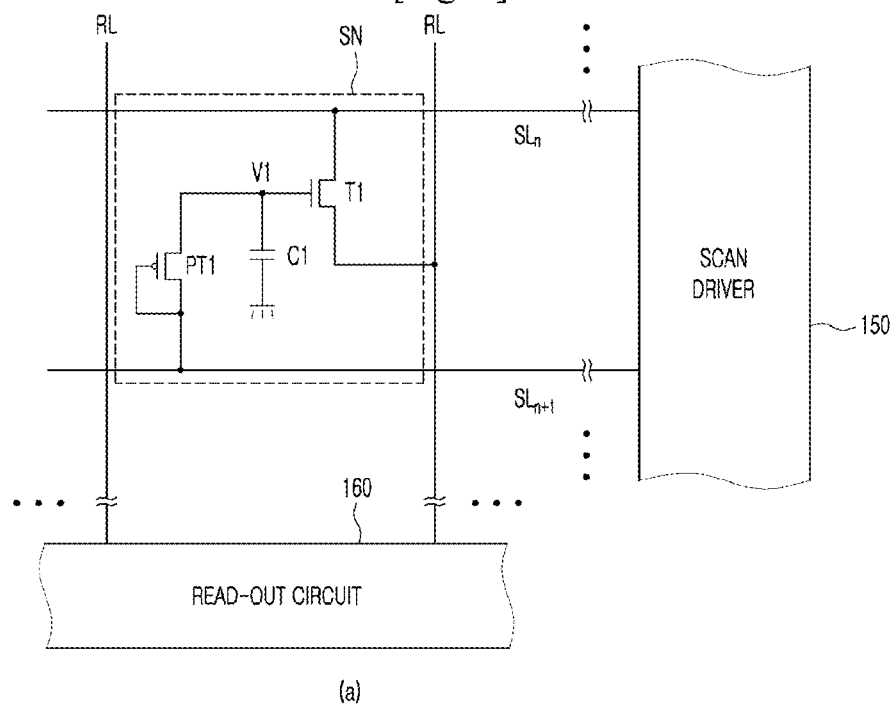
(a)
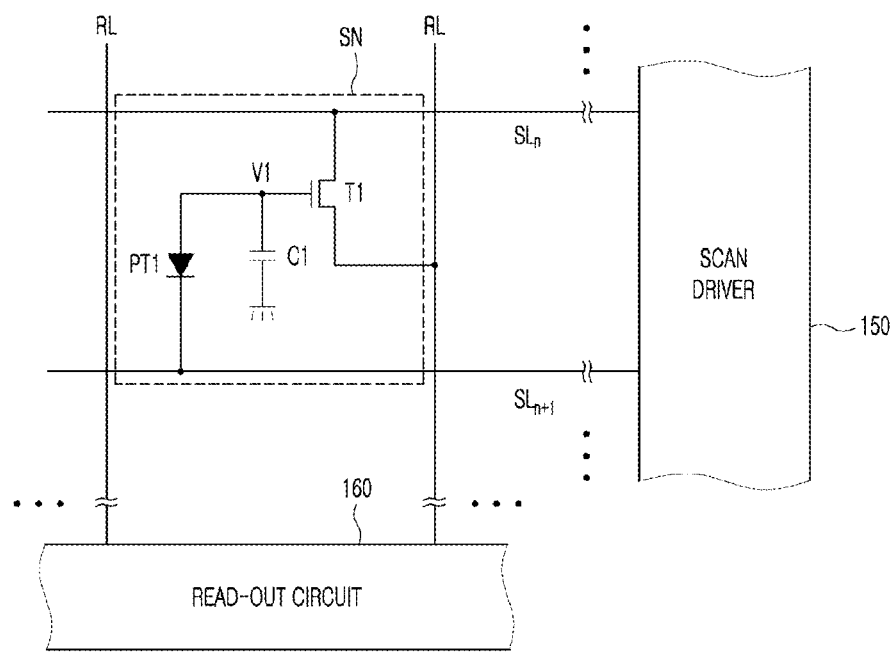
(b)

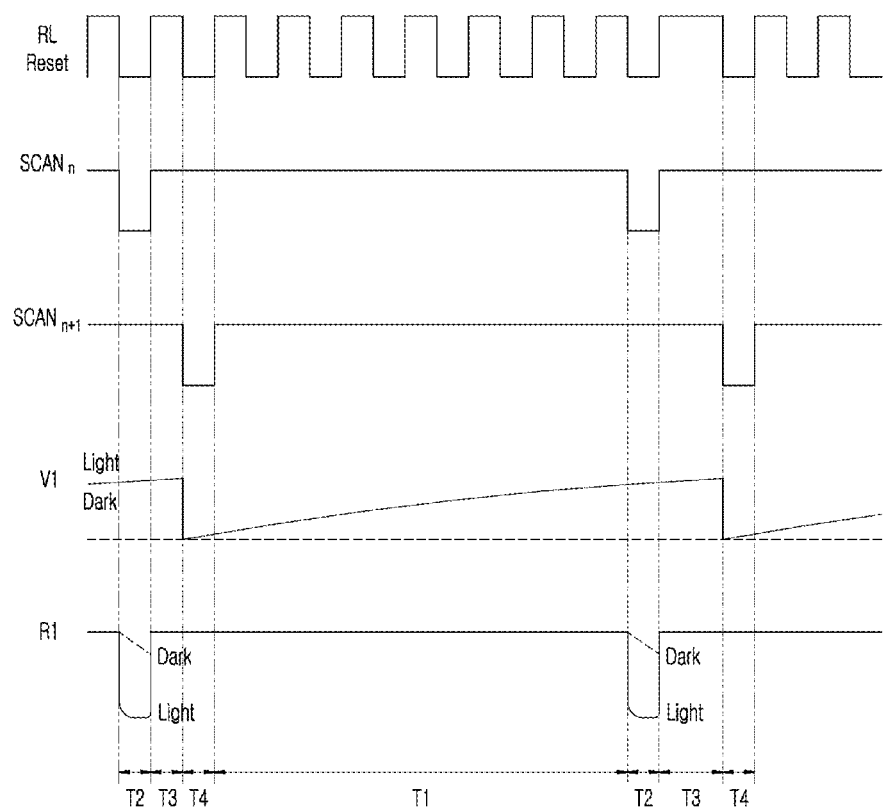
[Fig. 8]

[Fig. 9]
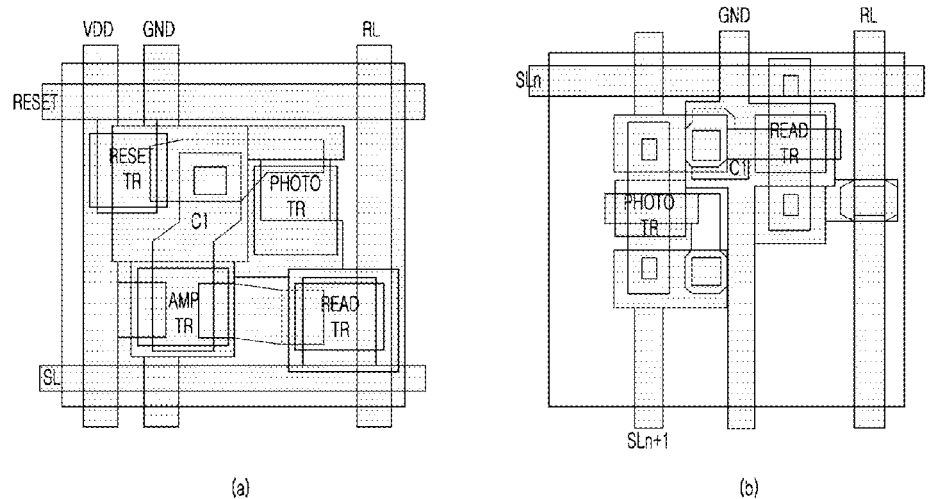
[Fig. 10]
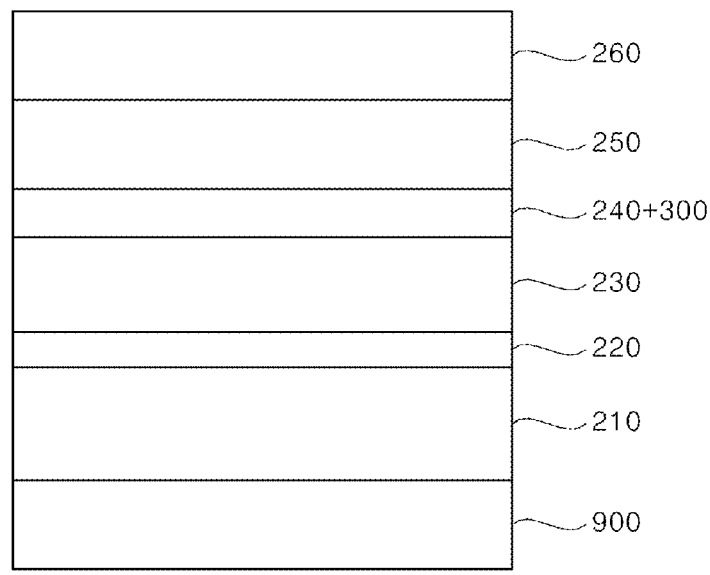

[Fig. 11]
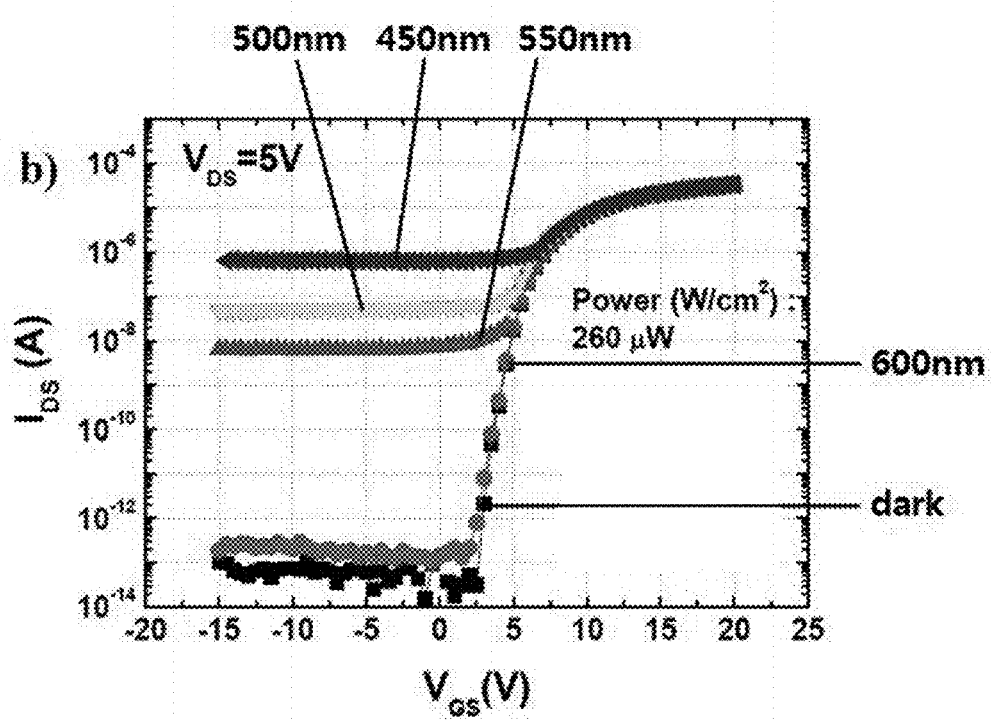

DISPLAY APPARATUS CAPABLE OF IMAGE SCANNING AND DRIVING METHOD THEREOF

CROSS-REFERENCE TO RELATED APPLICATIONS

This application claims the benefit under 35 U.S.C. § 119 of Korean Application Nos. 10-2014-0156874, filed on Nov. 12, 2014 and 10-2014-0190693, filed on Dec. 26, 2014, which are hereby incorporated by reference in their entirety.

BACKGROUND

Technical Field

The present invention relates to a display apparatus capable of image scanning and a driving method thereof. More specifically, the present invention relates to a display apparatus capable of image scanning with an aperture ratio improved than the conventional one and a driving method thereof.

Related Arts

A touchscreen panel is a device for inputting user command by touching letters or diagrams displayed on the screen of an image display device with a human finger or other touch means, and is used attached to an image display device. The touchscreen panel converts the touch location touched with the human finger, etc. into electrical signals. The electrical signal is used as an input signal.

The touchscreen panel adopts various touch detection methods such as a resistance membrane method, an optical method, a capacitive method, an ultrasonic wave method, etc. Among them, according to the optical method, the touchscreen panel detects whether a touch is made through the change in optical properties in a corresponding location when a touch generating means contacts the screen of a display apparatus. Due to its properties, there is no limitation in the type of touch generating means in the optical method.

Meanwhile, recently, as security matters are becoming an issue, security issues relating to personal portable devices such as smartphones, tablet PCs, etc. are on the rise. As portable devices are being used more frequently, security is a requisite for e-commerce through portable devices, and according to such needs, biometric data such as fingerprints, iris, face, voice, blood veins, etc. are used.

Among the various biometric information authentication technologies, the most commonly used technology is the authentication technology using fingerprints. Recently, products introducing fingerprint recognition and authentication technology using the same to smartphones and tablet PCs, etc. have been released.

However, in order to graft sensors for fingerprint recognition on portable devices, a separate device for fingerprint recognition needs to be installed, in addition to an image display device, which makes the volume of portable devices bigger.

Also, recently, flexible image display devices are being developed, and in this case, the touchscreen panel applied to the flexible image display device needs to be flexible as well.

Thus, it became necessary to develop a technology granting flexibility, without requiring a separate space for a fingerprint recognition sensor in the portable device, while not bothering the display area.

SUMMARY OF INVENTION

The present invention aims to solve the above problems of the related art. It is an object of the present invention to provide a display apparatus integrated with a contact sensor of a source follower manner with an improved aperture ratio and a reduced circuit area.

According to an embodiment of the present invention for achieving the purpose, a display apparatus capable of image scanning, which includes a plurality of contact sensors each of which includes an N-type transistor, a P-type transistor where a drain electrode is connected to a gate electrode of the N-type transistor, and a sensing capacitor one end of which is connected to the drain electrode of the P-type transistor, the contact sensors being arranged so as not to cover a unit color pixel area of a color filter layer; a first scan line to which a selective signal is periodically applied, the first scan line being connected to a source electrode of the N-type transistor; a second scan line to which a selective signal is applied followed by the first scan line, the second scan line being connected to a gate electrode and a source electrode of the P-type transistor; and a readout line connected to a drain electrode of the N-type transistor is provided.

When the selective signal is not applied to the first scan line and the second scan line, a leakage current of the N-type transistor formed by a light supplied from outside may charge the sensing capacitor.

When the selective signal is applied to the first scan line, a current which is proportional to an amount of electric charge stored in the sensing capacitor may flow in the drain electrode of the N-type transistor in a source electrode direction.

The display apparatus may determine whether contact is made to an upper part of the contact sensors and contact condition based on the change in a potential value of the readout line connected to the drain electrode of the N-type transistor while the selective signal is applied to the first scan line.

When the application of the selective signal for the first scan line is terminated, potential of the readout line may be reset.

After the reset, the selective signal may be applied to the second scan line to reset the sensing capacitor.

The plurality of contact sensors may be arranged at an upper side or a lower side of the color filter layer extracting color in a pixel unit from a light of a backlight source.

The plurality of contact sensors may be arranged between one of the two substrates forming the display apparatus and a cover window protecting the display apparatus.

The plurality of contact sensors may be arranged at an upper part of the cover window protecting the display apparatus, and a protective layer for protecting the contact sensors may be formed on the upper part of the plurality of contact sensors.

The plurality of contact sensors may be arranged at the same layer as a thin-film transistor layer where driving circuits for driving the display apparatus are formed.

Meanwhile, according to another embodiment of the present invention, a display apparatus capable of image scanning, which includes a plurality of contact sensors each of which is arranged so as not to be overlapped with the unit color pixel area of the color filter layer, the contact sensor including a first transistor generating an amount of electric charge corresponding to a strength of a light reflected from an outside object; a sensing capacitor storing a charge generated by the first transistor; and a second transistor where a current which is proportional to an amount of electric charge stored in the sensing capacitor flows when a selective signal for the contact sensor is applied is provided.

The current flowing when applying the selective signal flows to a selective line to which the selective signal is applied from the readout line through the second transistor.

Additionally, according to yet another embodiment of the present invention, a method of scanning an image in a display apparatus which includes the steps of charging an amount of electric charge generated from a first transistor by a light reflected from an outside object in a sensing capacitor; applying a selective signal to a source electrode of a second transistor to which a gate electrode is connected to the sensing capacitor; and detecting potential of the readout line connected to a drain electrode of the second transistor to determine whether contact is made to an upper part of the contact sensors and contact condition is provided.

The method may further include the step of resetting the readout potential after determining whether contact is made and contact condition.

The method may further include the step of applying a selective signal to a source electrode of the first transistor, allowing a charge stored in the sensing capacitor to be leaked through the first transistor, after the resetting.

Furthermore, according to still another embodiment of the present invention, a method of scanning an image in a display apparatus, which includes the steps of receiving light reflected from an outside object in at least a part of the plurality of contact sensors by illuminating light with different wavelength areas, allowing an amount of electric charge generated by a leakage current by the light-receiving to be charged in the sensing capacitor of the contact sensor, applying a selective signal to a source electrode of a transistor to which a gate electrode is connected in the sensing signal, and detecting potential which varies depending on illumination of lights with different wavelength areas, as potential of a readout line connected to a drain electrode of the transistor, to determine whether contact is made to an upper part of the contact sensors and contact condition is provided.

According to embodiments of the present invention, the present invention may obtain a high detection signal without an amplifier by using a contact sensor of a source follower manner as a contact sensor grafted to the display apparatus.

Additionally, according to embodiments of the present invention, a circuit area of the contact sensor of a source follower manner may be reduced, and accordingly an aperture ratio may be improved.

BRIEF DESCRIPTION OF DRAWINGS

FIG. 1 is a view illustrating an image of an electronic equipment according to an embodiment of the present invention;

FIGS. 2a, 2b, 2c and 2d are cross-sectional views illustrating the constitution of a display apparatus having an image scanning function according to an embodiment of the present invention;

FIG. 3 is a plan view illustrating the constitution of the display apparatus according to an embodiment of the present invention;

FIG. 4 is a view illustrating the constitution of a sensor array layer implementing the image scanning function according to an embodiment of the present invention;

FIG. 5 is a circuit diagram illustrating a first exemplary embodiment of the contact sensor illustrated in FIG. 4;

FIG. 6 is a circuit diagram illustrating an exemplary embodiment for the contact sensor of FIG. 4;

FIG. 7 is a circuit diagram illustrating the constitution of the contact sensor which may be applied to a display apparatus according to an embodiment of the present invention;

FIG. 8 is a timing diagram for explaining the operation of the contact sensor SN according to an embodiment of the present invention;

FIG. 9 is a plan view illustrating the circuit structure of the contact sensor according to an embodiment of the present invention in a layout;

FIG. 10 is a view for explaining a method for performing fingerprint recognition in a display apparatus with an image scanning function according to an embodiment of the present invention; and FIG. 11 is a graph illustrating the characteristic change in the contact sensor according to a wavelength area of a light source in a method for recognizing a fingerprint according to an embodiment of the present invention.

DETAILED DESCRIPTION

Hereinafter, the present invention will be explained with reference to the accompanying drawings. The present invention, however, may be modified in various different ways, and should not be construed as limited to the embodiments set forth herein. Also, in order to clearly explain the present invention, portions that are not related to the present invention are omitted, and like reference numerals are used to refer to like elements throughout.

Throughout the specification, it will be understood that when an element is referred to as being "connected to" another element, it may be "directly connected to" the other element, or intervening elements or layers may be present. Also, it will also be understood that when a component "includes" an element, unless there is another opposite description thereto, it should be understood that the component does not exclude another element but may further include another element.

In the present specification, "contact recognition" means a function recognizing an object in contact with a surface, and it should be understood to cover recognition of fingerprint or touch by a human finger, or recognition of touch by other touch generating means.

Hereinafter, examples of the present invention will be explained in more detail with reference to the accompanying drawings.

FIG. 1 is a view illustrating an image of an electronic equipment according to an embodiment of the present invention.

Referring to FIG. 1, an electronic equipment 10 according to an embodiment includes a display apparatus DP.

The electronic equipment 10 may be a digital equipment including wireless or wired communication functions or other functions. For example, it may be a digital equipment with operation skills including a memory means and a microprocessor, such as mobile phones, navigations, web pads, PDAs, workstations, personal computers (e.g., laptop computers, etc.). Smartphone will be presented as a preferable example, but electronic equipment is not necessarily limited thereto.

A display apparatus DP is formed on a surface of an electronic equipment 10. Preferably, as illustrated in FIG. 1, the display apparatus may be formed on a front surface of an electronic equipment 10 and implemented as a touchscreen panel performing the function as an input device as well.

According to an embodiment of the present invention, the display apparatus DP may perform the function of recognizing a fingerprint, in addition to detecting whether contact is made by a touch generating means (for example, finger, etc.) and the contact location.

Specifically, when driving a first application, the display apparatus DP may function as a touchscreen for driving a specific function, and when driving a second application, the fingerprint recognition function may be implemented in the fingerprint input window FP area displayed on the display apparatus DP or the entire area of the display apparatus DP.

As will be described below, touch by a touch generating means or contact by a ridge and valley of a fingerprint is made by sensors consisting of a plurality of rows and columns. In order to recognize fingerprints, contact by the ridge and contact by the valley need to be distinguished from one another. Thus, the resolution of sensing contact associated with the number of sensors included in the display apparatus DP should be formed to an extent to distinguish the contact by the ridge from the contact by the valley of fingerprints.

FIGS. 2a, 2b, 2c and 2d are cross-sectional views illustrating the constitution of a display apparatus having an image scanning function according to an embodiment of the present invention. FIGS. 2a, 2b, 2c and 2d present a constitution integrating the image scanning function into a liquid crystal display (LCD) as an example.

Referring to FIGS. 2a, 2b, 2c and 2d, the LCD includes a first substrate 210, a thin film transistor layer 220, a liquid crystal layer 230, a color filter layer 240, a second substrate 250, and a cover window 260, layered in order.

The LCD is operated by a principle implementing the desired color and image by allowing light illuminated from a back light unit (BLU) placed on the lower part of a first substrate 210 to penetrate into a liquid crystal layer 230, and then pass through a color filter layer 240 implementing colors by extracting colors in pixel units. The thin film transistor layer 220 has a function of delivering or controlling electronic signals, and the liquid crystal present on the liquid crystal layer 230 controls the penetration of light by varying molecular structure according to the applied electronic signal.

The sensor array layer 300 performing the function of detecting contact by a touch generating means or recognizing fingerprints according to an embodiment of the present invention, i.e., performing the image scanning function, may be arranged on a certain area of the LCD.

First, as illustrated in FIG. 2a, the sensor array layer 300 according to an embodiment may be arranged in a layer adjacent the color filter layer 240. In this case, the sensor array layer 300 may be arranged in a lower area of the color filer layer 240 or in an area between a color filter area 240 and a second substrate 250.

Next, as illustrated in FIG. 2b, the sensor array layer 300 according to an embodiment may be arranged between a second substrate 250 and a cover window 260, and as illustrated in FIG. 2c, the sensor array layer may be arranged in the upper part of the cover window 206 to protect the display apparatus.

As illustrated in FIG. 2c, when a sensor array layer 300 is arranged in the upper part of the cover window 260, a separate protective layer 270 should be formed on top of it in order to protect the sensor array layer 300.

Meanwhile, as illustrated in FIG. 2d, the sensor array layer 300 according to an embodiment may be formed on the same layer as the thin film transistor layer 220 implemented with circuits for driving the display apparatus.

In the above, an example of implementing the display apparatus as an LCD was explained. However, it is obvious that the display apparatus may be implemented as other types of display apparatuses such as an organic light emitting diode (OLED) display apparatus or an electro phoretic display (EPD), etc.

The OLED display apparatus may be formed in a structure having OLED elements formed with electrode layers on both surfaces, arranged on the substrate. However, in this case, the sensor array layer 300 having an image scanning function according to an embodiment of the present invention may be formed on the upper part of the substrate or the upper part of the OLED element, etc.

FIG. 3 is a plan view illustrating the constitution of the display apparatus according to an embodiment of the present invention.

FIG. 3 illustrates a color filter layer 240 and a sensor array layer 300. As illustrated above, the sensor array layer 300 may be formed on a relatively upper part with respect to the color filter layer 240, or on its lower part.

The sensor array including a plurality of contact sensors according to an embodiment may be formed on the front surface of the display, and may be formed on a certain area of the display according to another embodiment. When the sensor array is formed on a certain area of the display, an area without a contact sensor may be configured so that there is no step between the area and an area with a contact sensor through passivation (not shown).

The sensor array layer 300 includes a plurality of contact sensors SN. The contact sensor SN may be implemented as a visible ray sensor sensing light of visible ray area or an infrared ray sensor sensing light of infrared ray area.

The color filter layer 240 may be configured to include red pixels R indicating red images, green pixels G indicating green images, and blue pixels B indicating blue images. Each one of the red pixel R, green pixel G, and blue pixel B forms one unit pixel, and it may be explained that these unit pixels are formed in the form of a matrix consisting of a plurality of rows and columns. Accordingly, one unit pixel may include one contact sensor SN.

According to an embodiment, the contact sensor SN is formed on the sensor array layer 300, and when viewed from the top, the sensing circuit (e.g., transistor and wirings) of the contact sensor SN is arranged in an area not overlapping the red pixel R, green pixel G and blue pixel B of the color filter layer 240, and the pixel electrode of the contact sensor SN may be arranged in an area overlapping at least a part of the color pixels (R, G or B) as a transparent electrode material such as ITO, etc. or in a certain area not overlapping the color pixels. FIG. 3 illustrates providing a contact sensor SN at the lower part of the unit pixel. However, the contact sensor may be provided at the upper part or side surface part, etc. of the unit pixel. Also, one of the red pixel R, green pixel G, and blue pixel B may be made to be relatively smaller so as to place the sensing circuit of the contact sensor SN in a corresponding location.

According to another embodiment, when using a transparent electrode material for the transistor and wiring, the contact sensor SN may be formed to overlap the red pixel R, green pixel G and blue pixel B of the color filter layer 240 up to the sensing circuit, in addition to the pixel electrode, in the sensor array layer 300. Accordingly, since the contact sensor SN may be formed to overlap unit pixels, the resolution of image sensing may increase by arranging at least two contact sensors SN for each unit pixel, and the sensitivity of image sensing may be improved by forming the unit contact sensor SN to be larger.

FIG. 4 is a view illustrating the constitution of a sensor array layer implementing the image scanning function according to an embodiment of the present invention.

Referring to FIG. 4, the sensor array layer 300 includes a plurality of scan lines (SL1, SL2, . . . SLn) and a plurality of readout lines (RL1, RL2, . . . RL1). The plurality of scan lines (SL1, SL2, . . . SLn) are provided with scan signals in order, and the plurality of readout lines (RL1, RL2, . . . RL1) receive signals outputted from the contact sensor SN and deliver them to a circuit (not shown) which processes the signals.

According to an embodiment, the scan signal provided to the plurality of scan lines may be provided from a scan driver of the sensor array layer 300.

The scan lines (SL1, SL2, . . . , SLn) and readout lines (RL1, RL2, . . . , RL1) are arranged to intersect one another, and at least one contact sensor SN may be formed at each intersection.

FIG. 5 is a circuit diagram illustrating a first comparative example of the contact sensor SN illustrated in FIG. 4. Referring to FIG. 5, the contact sensor SN includes a photodiode PD, a transistor T1, and a sensing capacitor C0.

A photodiode (PD) is an element converting optical energy into electric energy. When light reaches a photodiode (PD), a current flows. A cathode of a photo diode (PD) is connected to the source of the switch transistor T1 and an anode is connected to ground voltage. Such photodiode (PD) may be implemented as organic light emitting diode (OLED), quantum dot (QD), or transistor, etc.

One end of a sensing capacitor C0 is connected to the source of a switch transistor T1, and the other end of the sensing capacitor C0 is connected to ground voltage. A response to the change of the potential of one end of the sensing capacitor C0 is delivered to the readout lines (RL1, RL2), and the signals delivered to the readout lines (RL1, RL2) are delivered to a predetermined IC chip. The gate electrode of the switch transistor T1 is connected to scan lines (SL1~SLn), the drain electrode is connected to the readout lines (RL1, RL2), and the source electrode is connected to the cathode of the photodiode (PD). Such switch transistor T1 may be implemented as transistors such as hydrogenated amorphous silicon (a-Si:H), poly silicon (Poly-Si), oxide transistor, etc. Also, it is not limited thereto, and may be implemented as an organic thin film transistor (organic TFT), etc.

The method of sensing light received from outside, i.e., light received at the contact sensor SN being reflected by a contact means, by the contact sensor SN, and delivering a signal corresponding to the size of the sensed light will be explained in the following.

A predetermined voltage is applied to the readout lines (RL1, RL2). A separate circuit (not shown) for applying voltage may be further included. When a selective signal for turning on the switch transistor T1 is applied to the scan lines (SL1~SLn), the potential V1 of an end of the sensing capacitor C0 is set with a voltage applied to the readout lines (RL1, RL2). That is, by turning on the switch transistor T1, the sensing capacitor C0 is set with a voltage applied to the readout lines (RL1, RL2).

When the light reflected from an outside object is not received, a current does not flow in the photodiode (PD), and accordingly the potential (V1) of an end of the sensing capacitor C0 is maintained at the set voltage.

The readout lines (RL1, RL2) are reset with a predetermined period. For example, after resetting the readout lines (RL1, RL2) to a potential of 0V, when the switch transistor T1 is turned on by inputting the next selective signal to the scan lines (SL1~SLn), the electric charge stored in the sensing capacitor C0 is shared with the parasitic capacitance (not shown) of the readout lines (RL1, RL2).

When the voltage applied to the readout lines (RL1, RL2) is referred to as Vdc, the parasitic capacitance of the readout lines (RL1, RL2) is referred to as Cp1, and an end potential of the sensing capacitor C0 is referred to as V1, the following equation is established.

$$V1(CO + Cpl)Vdc \times CO \qquad \text{[Equation 1]}$$
$$V1 = \frac{Vdc \times CO}{CO + Cpl}$$

However, when receiving the light reflected from an outside object, a current flows in the photodiode PD. Accordingly, there is a difference in the total amount of electric charge shared by the sensing capacitor C0 and the parasitic capacitance of the readout lines RL1 and RL2, and the potential V1 of an end of the sensing capacitor C0 varies in Equation 1.

As the strength of the incident light increases, the size of the current flowing in the photodiode PD increases, and accordingly the change in the potential V1 of an end of the sensing capacitor C0 increases, and the total amount of electric charge shared by the sensing capacitor C0 and the parasitic capacitance of the readout lines RL1 and RL2 increases as well. Thus, an output signal of different levels is obtained from the readout lines RL1 and RL2 according to the strength of the incident light at the photodiode PD.

The method explained in the above is a method using the phenomenon of sharing electric charges between the sensing capacitor C0 and the parasitic capacitance of the readout lines RL1 and RL2. Thus, the level difference of output signal actually obtained from the readout lines RL1 and RL2 becomes the difference from the result of sharing electric charge with the sensing capacitor C0. Accordingly, the difference in signal size and level of output signal according to circumstance may not be great enough. Thus, a separate circuit for amplifying the output signal of the readout lines RL1 and RL2 is required.

FIG. 6. is a circuit diagram illustrating a contact sensor SN of a source follower manner, as another comparative example for a contact sensor SN illustrated in FIG. 4.

Referring to FIG. 6, the contact sensor SN of a source follower manner includes one photodiode PD, three transistors T1, T2 and T3, and one sensing capacitor C1.

A first transistor T1 is a transistor T1 which resets first electrode potential V1 of a sensing capacitor C1 according to a reset control signal Reset, and hereinafter is referred to as a reset transistor T1. A source electrode of the reset transistor T1 is connected to cathode of the photodiode PD, and a drain electrode is connected to an input voltage line VDD.

A gate electrode of a second transistor T2 is connected to cathode of the photodiode PD and a first electrode out of two electrodes of the sensing capacitor C1. Additionally, a drain electrode of the second transistor T2 is connected to the input voltage line VDD. The second transistor T2 converts the first electrode potential V1 of the sensing capacitor C1 into a current signal while amplifying V1. Thus, the second transistor T2 may be referred to as an amplifying transistor T2.

A gate electrode of a third transistor T3 is connected to a scan line SL, a drain electrode is connected to a source electrode of the amplifying transistor T2, and a source electrode is connected to a readout line RL. When a selective signal is applied to a scan line SL, the third transistor is in a turned-on state, and the first electrode potential V1 of the sensing capacitor C1 amplified by the amplifying transistor T2 is delivered to the readout line RL as the current signal. The third transistor T3 may be referred to as a selecting transistor T3.

Cathode and anode of the photodiode PD are respectively connected to a first electrode and a ground voltage of the sensing capacitor C1, and a first electrode and a second electrode of the sensing capacitor C1 are respectively connected to a gate electrode and a ground voltage of the amplifying transistor T2.

An operation of the contact sensor of a source follower manner is explained as below.

First of all, when the reset transistor T1 is in a turned-on state by the reset control signal Reset, the first electrode potential V1 of the sensing capacitor C1 is reset as potential of the input voltage line VDD.

When a light reflected by an outside object (for example, fingerprint of a human being) is supplied to the photodiode PD, a leakage current is generated. By this leakage current, a charge may be charged in the sensing capacitor C1.

As the charge is charged in the sensing capacitor C1, potential of the gate electrode of the amplifying transistor T2 connected to the first electrode of the sensing capacitor C1 increases. When the potential is over a threshold voltage, the amplifying transistor T2 is turned on, and accordingly, a current may flow in the amplifying transistor T2.

When the selecting transistor T3 is turned on, as the selective signal is applied to the scan line SL, the first electrode potential V1 which is in an amplified state of the sensing capacitor C1 is delivered to the readout line RL as the current signal through the amplifying transistor T2 and selecting transistor T3. By the delivery of current to the readout line RL, potential R1 of the readout line RL increases. The change in a value of readout voltage R1 when the selective signal is applied to the scan line RL is transmitted to an additional IC chip, and is converted into a digital signal through an analogue-digital converter ADC.

The potential R1 of the readout line RL is proportional to the first electrode potential V1 of the sensing capacitor, that is, the amount of electric charge charged in the sensing capacitor C1. The amount of electric charge stored in the sensing capacitor C1 is proportional to an amount of light applied to the photodiode PD. Thus, through the potential R1 of the readout line RL, it may be understood how much light is supplied to the corresponding contact sensor SN. Also, it may be understood whether there is a contact of an object per contact sensor SN and contact state (a contact distance, a contact area, etc.).

The contact sensor of a source follower manner explained with reference to FIG. 6 outputs an amplified signal by the amplifying transistor T2, so no additional amplifier is necessary. Additionally, since a signal may be detected by converting an analogue signal immediately into a digital signal, a rapid signal processing may be possible. However, since there are many transistors, a space which may be grafted in a pixel of the display apparatus is restrictive, and an aperture ratio may be low.

FIG. 7 is a circuit diagram illustrating the constitution of a contact sensor which may be applied to the display apparatus according to the embodiment of the present invention. FIGS. 7 (a) and (b) are circuit diagrams which are equivalent to each other. The contact sensor according to the embodiment of the present invention is basically a contact sensor of a source follower manner.

Referring to FIG. 7, the contact sensor SN according to an embodiment of the present invention may be arranged on the same location as the contact sensor SN explained with reference to FIG. 6. According to an embodiment, when viewing from a top view, the contact sensor SN may be arranged in an area which does not overlap a red pixel R, a green pixel G and a blue pixel B of the color filter layer 240 (see FIGS. 2a to 2d).

According to another embodiment, when using a transparent electrode material, the contact sensor SN may be formed to overlap the red pixel R, green pixel G and blue pixel B of the color filter layer 240 in a sensor array layer 300 (see FIGS. 2a to 2d). According to this, since the contact sensor SN is formed to overlap the unit pixel, two or more contact sensors SN are arranged per unit pixel, thereby increasing resolution of the image scanning. Additionally, the size of unit contact sensor SN is formed big, thereby improving sensitivity of the image scanning.

Explaining with reference to FIG. 7 (a), each contact sensor SN includes one P-type transistor PT1, one N-type transistor T1, and a sensing capacitor C1.

Each transistor PT1 and T1 may be implemented as silicon-based transistors such as hydrogenated amorphous silicon (a-Si:H), poly silicon (Poly-Si), oxide transistors, etc., but is not limited thereto. Additionally, each transistor may be implemented as an organic thin film transistor (organic TFT), etc.

The gate electrode and source electrode of the P-type transistor PT1 are connected to each other, and are equivalent to the photodiode PT1 as illustrated in FIG. 7 (b). The gate electrode and source electrode of the P-type transistor PT1 are connected to each other, thereby serving as cathode of the photodiode PT1, and the drain electrode serves as anode. The source electrode of the P-type transistor PT1 is connected to the scan line SLn+1. Meanwhile, the drain electrode of the P-type transistor PT1 is connected to the first electrode out of two electrodes of the sensing capacitor C1 and the gate electrode of the N-type transistor T1.

The gate electrode of the N-type transistor T1 is connected to the first electrode of the sensing capacitor C1 and the drain electrode of the P-type transistor PT1, and the drain electrode of the N-type transistor T1 is connected to the readout line RL. The source electrode of the N-type transistor T1 is connected to the scan line SLn.

The scan line SLn to which the source electrode of the N-type transistor T1 is connected and the scan line SLn+1 to which the source electrode of the P-type transistor PT1 are different from and adjacent to each other. The application of selective signal for a specific contact sensor SN among a plurality of contact sensors SN is made through the scan line. The selective signal may be sequentially applied to the first scan line SLn to which the source electrode of the N-type transistor T1 is connected and the second scan line SLn+1 to which the source electrode of the P-type transistor PT1 is connected.

Meanwhile, the sensing capacitor C1 charges a charge according to a leakage current formed by the P-type transistor PT1. The first electrode of the sensing capacitor C1 is connected to the gate electrode of the N-type transistor T1 and the drain electrode of the P-type transistor PT1, and the second electrode is connected to the ground voltage.

FIG. 8 is a timing diagram for explaining an operation of a contact sensor according to an embodiment of the present invention.

The RL Reset in FIG. 8 is a signal allowing potential of a readout line RL to be periodically reset. When the RL Reset signal is at a high level, the potential of the readout line RL may be reset.

SCANn is a signal applied to the first scan line SLn, and SCANn+1 is a signal applied to the second scan line SLn+1. When the signals SCANn and SCANn+1 supplied to the scan lines SLn and SLn+1 are at a low level, the contact sensor SN corresponding thereto is selected. For example, when the signal applied to the first scan line SLn is converted into a low level (when the selective signal is applied), the contact sensor SN including the N-type transistor T1 to which the drain electrode and source electrode are connected is selected for the readout line RL and the first scan line SLn, and a sensing value from the corresponding contact sensor SN is outputted to the readout line RL. A first frame may refer to a period of time when the signals SCANn and SCANn+1 supplied to the scan lines SLn and SLn+1 are at a low level again, after being converted into a low level from a high level.

Meanwhile, V1 represents the first electrode potential V1 of the sensing capacitor C1, and R1 represents the potential R1 of the readout line RL. A full line in a timing chart of V1 and R1 shows an image when a light reflected by the outside object is supplied to the contact sensor SN (Light), and a broken line shows an image when the light is not supplied (Dark).

Hereinafter, an operation of contact sensor SN will be explained with reference to FIGS. 7 and 8.

In T1 section, since the selective signal is not applied to the first scan line SLn and the second scan line SLn+1, there would be no current flow through the N-type transistor T1 and current flow from the P-type transistor PT1 to the second scan line SLn+1.

As illustrated in FIG. 8, T1 section may refer to a section until the low level signal is applied to the second scan line SLn+1 after applying the low level signal to the first scan line SLn. That is, T1 section is a section after T4 where the low level signal is applied to the second scan line SLn+1. When the low level signal is applied to the second scan line SLn+1 in T4 section, charges charged in the sensing capacitor C1 may leak through the P-type transistor PT1 serving as the photodiode, and thus the sensing capacitor C1 may be reset. Accordingly, the first electrode potential V1 of the sensing capacitor C1 becomes 0V.

Since the selective signal is not applied to the first scan line SLn and the second scan line SLn+1 in T1 section, when there is a leakage current in the P-type transistor PT1 serving as the photodiode, charges resulting from the corresponding leakage current are charged in the sensing capacitor C1.

If the light reflected from outside is not supplied, the leakage current is not formed in the P-type transistor PT1. Thus, there would be no charge storage in the sensing capacitor C1 connected to the drain electrode of the P-type transistor PT1, and the first electrode potential V1 of the sensing capacitor C1 is maintained at a low level (Dark).

In comparison, when the light reflected from outside during T1 section is supplied, as mentioned above, the leakage current is formed in the P-type transistor PT1. The charge is charged in the sensing capacitor C1 by this leakage current, and the charging continues until the low level signal is applied to the second scan line SLn+1, that is, during the first frame. Accordingly, the first electrode potential V1 of the sensing capacitor C1 gradually increases (Light).

At this time, when the signal SCANn supplied to the first scan line SLn is converted from a high level to a low level (T2 section), source electrode potential of the N-type transistor T1 will be lower than drain electrode potential.

If the light reflected from outside is not supplied, the charge is not charged in the sensing capacitor C1 in T1 section, and thereby gate electrode potential of the N-type transistor T1 will be less than a threshold voltage. Thus, the N-type transistor T1 will not be turned on. Accordingly, a microcurrent flows or no current flows in the N-type transistor T1. Additionally, the potential R1 of the readout line RL may be maintained to be the same as T1 section, or may be decreased to a certain degree by a microcurrent flow (Dark).

However, when the light reflected from outside is supplied, the gate electrode potential V1 of the N-type transistor T1 may exceed a threshold voltage. Thus, the current flows from the drain electrode of the N-type transistor T1 to the source electrode. That is, the current flows from the readout line RL to the first scan line SLn. The size of current flowing is proportional to the size of gate electrode potential of the N-type transistor T1, that is, the size of the first electrode potential V1 of the sensing capacitor C1. As the strength of light reflected from outside gets greater, the size of leakage current formed by the P-type transistor PT1 becomes greater. Accordingly, since the first electrode potential V1 of the sensing capacitor C1 becomes great, a width of the potential R1 of the readout line RL which becomes lower by the current flowing through the N-type transistor T1 in T2 section may be proportional to the strength of light supplied. That is, as the strength of light reflected from outside gets greater, the potential R1 of the readout line RL in T2 section becomes lower greatly (Light). In T2 section, that is, when the low level signal is applied to the first scan line SLn, a value of potential R1 of the readout line RL is delivered to an additional IC chip, based on which determination whether contact is made to an upper part of the corresponding contact sensors and contact condition may be made.

Since the contact sensor is included per pixel of the display apparatus, a determination whether contact is made and contact condition may be confirmed for each pixel. Additionally, fingerprint recognition may be possible by determining whether there is a touch by a touch generating means and a point where the touch is made as well as by determining whether a ridge or a valley of a fingerprint is contacted per pixel when contact by a user's finger is made.

After T2 section, the reset signal RL Reset for resetting the potential R1 of the readout line RL is applied, and accordingly, the potential R1 of the readout line RL is reset to the same level as a level before the low level signal is applied to the first scan line SLn.

When the signal SCANn+1 supplied to the second scan line SLn+1 gets lower from a high level to a low level (T4 section) after the potential R1 of the readout line RL is reset, charges stored in the sensing capacitor C1 may leak to the second scan line SLn+1 through the P-type transistor PT1, and accordingly, the first electrode potential V1 of the sensing capacitor C1 may be reset. Afterwards, when a section where the low level signal is applied to the second scan line SLn+1 is terminated, operations in T1, T2 and T3 sections mentioned above are repeated.

When making the photodiode PD in a general contact sensor of a source follower manner explained with reference to FIG. 6 be equivalent to the transistor, and comparing it with the contact sensor of a source follower manner of the present invention explained with reference to FIG. 7, it may be understood that two transistors are reduced in the contact sensor of the present invention. Thus, the contact sensor SN is formed on the substrate forming the display area. For the same reason above, as elements forming the contact sensor SN get reduced, an aperture ratio in an entire display panel may be improved.

FIG. 9 is a plan view illustrating a circuit structure of the contact sensor in a layout. Specifically, FIG. 9 (a) illustrates a structure of a contact sensor explained with reference to FIG. 6, and FIG. 9 (b) illustrates a structure of a contact sensor explained with reference to FIG. 7.

Referring to FIG. 9 (a), for a conventional contact sensor of a source follower manner, four transistors and one capacitor were needed. However, referring to FIG. 9 (b), the contact sensor of a source follower manner according to the embodiment of the present invention, only two transistors and one capacitor are needed.

Thus, according to the embodiment of the present invention, compared to the conventional contact sensor of a source follower manner, the present invention may reduce an area of the circuit configuration (reduced by about 27%). Additionally, when the contact sensor is grafted in in the display apparatus, its aperture ratio may be improved.

Also, without an amplifier, the present invention may maintain an advantage of a source follower manner from which a high detection signal may be obtained.

FIG. 10 is a view for explaining a method performing fingerprint recognition for a display apparatus having an image scanning function according to an embodiment of the present invention. FIG. 11 is a graph illustrating a difference in the property of the contact sensor according to wavelength area of light source in a method for recognizing fingerprint according to an embodiment of the present invention.

Referring to FIG. 10, a back light unit is arranged at the lower part of the first substrate 210 of the display apparatus explained with reference to FIG. 2a. Together with this back light unit, the display apparatus may further include a light source for a sensor 900.

The light source for a sensor 900 may include a plurality of light sources having different wavelength areas. For example, the light source of a sensor may include a red light source, a green light source, a blue light source, and a white light source. Also, the light source for a sensor 900 may include a light source providing, for example, light in the infrared ray area, not in the visible ray area.

When the fingerprint recognition function is activated by an application installed in the electronic equipment 10 (refer to FIG. 1), the user contacts his finger on a specific area. In this case, the light source for a sensor 900 activates the light source of different wavelength areas one by one in order. The light illuminated from the light source for a sensor 900 is received at the contact sensor by being reflected by the ridge or fingerprint of the finger. However, even if the light is reflected on the same point, the property of the light received with the contact sensor may vary according to the wavelength area of the light illuminated from the light source for a sensor 900. When the property of the light received with the contact sensor varies, the electric value formed at the sensing transistor included in the contact sensor varies accordingly.

Referring to FIG. 11, it may be understood that the property of change in drain-source current $I_{DS}$ according to the gate-source voltage $V_{GS}$ of the sensing transistor may vary according to the wavelength area of the light source used.

According to an embodiment, a contact sensor may be configured by setting a wavelength area of the light received with the contact sensor in the design step of the electronic equipment 10 and using a sensing transistor made of a material receiving the corresponding wavelength area more efficiently.

According to another embodiment, fingerprint recognition is performed over a plurality of times using a light source for a sensor 900 having various wavelength areas. Whenever using a light source having different wavelength areas, the fingerprint is scanned in order from the top to bottom. Specifically, as illustrated in FIG. 1, by illuminating a light source from the top of a fingerprint to the bottom, or in the reverse direction, a light reflected by the ridge or valley of the fingerprint is detected by a contact sensor and is output as the electric signal. Accordingly, a fragment fingerprint image parallel in the transverse direction of the finger is obtained from the top of the finger to the bottom, and a complete fingerprint image is obtained by combining the fragment fingerprint images. When obtaining a fingerprint image having different properties using a light source of different wavelength areas, the final fingerprint image may be obtained by combining output signals respectively detected for light illuminated in different wavelength areas or comparing and synthesizing each fingerprint image.

As a result, it becomes possible to obtain a more accurate fingerprint image because a plurality of fingerprint images is obtained using a light source having different wavelength areas, and the final fingerprint image is obtained by comparing them.

Although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims. Therefore, it should be understood that the forgoing description is by way of example only, and is not intended to limit the present disclosure. For example, each constituent explained in singular form may be carried out being dispersed, and likewise, constituents explained as being dispersed may be carried out in combined forms.

The scope of the present disclosure is defined by the foregoing claims, and it is intended that the present disclosure covers the modifications or variations of the present disclosure provided they come within the scope of the appended claims and their equivalents.

EXPLANATION OF REFERENCE NUMERAL

210: First substrate
220: Thin-film transistor layer
230: Liquid crystal layer
240: Color filter layer
250: Second substrate
260: Cover window
270: Protective layer
300: Sensor array layer
SN: Contact sensor
SL: Scan line
RL: Readout line
VDD: Input voltage line
T1: N-type transistor
PT1: P-type transistor
C1: Sensing capacitor

What is claimed is:
1. A display apparatus capable of image scanning, comprising:
a plurality of contact sensors, each of which comprises an N-type transistor, a P-type transistor where a drain electrode is connected to a gate electrode of the N-type transistor, and a sensing capacitor one end of which is connected to the drain electrode of the P-type transistor, the plurality of contact sensors being arranged so as not to cover a unit color pixel area of a color filter layer;

a first scan line to which a selective signal is periodically applied, the first scan line being connected to a source electrode of the N-type transistor;

a second scan line to which the selective signal is applied followed by the first scan line, the second scan line being connected to a gate electrode and a source electrode of the P-type transistor; and a readout line connected to a drain electrode of the N-type transistor.

2. The display apparatus of claim 1, wherein when the selective signal is not applied to the first scan line and the second scan line, a leakage current of the N-type transistor formed by a light supplied from outside charges the sensing capacitor.

3. The display apparatus of claim 2, wherein when the selective signal is applied to the first scan line, a current in proportional to an amount of electric charge stored in the sensing capacitor flows in the drain electrode of the N-type transistor in a source electrode direction.

4. The display apparatus of claim 3, wherein whether contact is made to an upper part of the contact sensors and contact condition is determined based on the change in a potential value of the readout line connected to the drain electrode of the N-type transistor while the selective signal is applied to the first scan line.

5. The display apparatus of claim 3, wherein when the application of the selective signal for the first scan line is terminated, potential of the readout line is reset.

6. The display apparatus of claim 5, wherein after the reset, the selective signal is applied to the second scan line to reset the sensing capacitor.

7. The display apparatus of claim 1, wherein the plurality of contact sensors are arranged at an upper side or a lower side of the color filter layer extracting color in a pixel unit from a light of a backlight source.

8. The display apparatus of claim 1, wherein the plurality of contact sensors are arranged between one of the two substrates forming the display apparatus and a cover window protecting the display apparatus.

9. The display apparatus of claim 1, wherein the plurality of contact sensors are arranged at an upper part of the cover window protecting the display apparatus, and a protective layer for protecting the contact sensors is formed on the upper part of the plurality of contact sensors.

10. The display apparatus of claim 1, wherein the plurality of contact sensors are arranged on the same layer as a thin-film transistor layer where driving circuits for driving the display apparatus are formed.

11. A display apparatus capable of image scanning, comprising a plurality of contact sensors each of which is arranged so as not to be overlapped with a unit color pixel area of a color filter layer, wherein the contact sensor comprises:

a first transistor generating an amount of electric charge corresponding to a strength of a light reflected from an outside object;

a sensing capacitor storing a charge generated by the first transistor; and a second transistor where a current which is proportional to an amount of electric charge stored in the sensing capacitor flows when a selective signal for the contact sensor is applied.

12. The display apparatus of claim 11, wherein the current flowing when applying the selective signal flows to a selective line to which the selective signal is applied from the readout line through the second transistor.

13. A method of scanning an image in a display apparatus, comprising:

charging an amount of electric charge generated from a first transistor by a light reflected from an outside object in a sensing capacitor;

applying a selective signal to a source electrode of a second transistor to which a gate electrode is connected to the sensing capacitor; and detecting potential of the readout line connected to a drain electrode of the second transistor to determine whether contact is made to an upper part of the contact sensors and contact condition.

14. The method of claim 13, further comprising resetting the readout potential after determining whether contact is made and contact condition.

15. The method of claim 14, further comprising applying a selective signal to a source electrode of the first transistor allowing a charge stored in the sensing capacitor to be leaked through the first transistor, after the resetting.

16. A method of scanning an image in a display apparatus, comprising:

receiving light reflected from an outside object in at least a part of the plurality of contact sensors by illuminating light with different wavelength areas;

allowing an amount of electric charge generated by a leakage current by the light-receiving to be charged in the sensing capacitor of the contact sensor;

applying a selective signal to a source electrode of a transistor to which a gate electrode is connected in the sensing signal; and detecting potential which varies depending on illumination of lights with different wavelength areas, as potential of a readout line connected to a drain electrode of the transistor, to determine whether contact is made to an upper part of the contact sensors and contact condition.

* * * * *